(12) United States Patent
Koontz

(10) Patent No.: US 11,390,329 B2
(45) Date of Patent: Jul. 19, 2022

(54) MUD FLAP RETRACTORS

(71) Applicant: Jeff Koontz, Taneytown, MD (US)

(72) Inventor: Jeff Koontz, Taneytown, MD (US)

( * ) Notice: Subject to any disclaimer, the term of this patent is extended or adjusted under 35 U.S.C. 154(b) by 0 days.

(21) Appl. No.: 17/183,527

(22) Filed: Feb. 24, 2021

(65) Prior Publication Data
US 2021/0261200 A1  Aug. 26, 2021

Related U.S. Application Data

(60) Provisional application No. 62/980,608, filed on Feb. 24, 2020.

(51) Int. Cl.
*B62D 25/18* (2006.01)

(52) U.S. Cl.
CPC ......... *B62D 25/184* (2013.01); *B62D 25/188* (2013.01)

(58) Field of Classification Search
CPC .... B62D 25/184; B62D 25/188; B62D 25/18; B62D 25/182; B62D 25/186; B62D 25/16; B62D 25/168; B60G 2202/412
See application file for complete search history.

(56) References Cited

U.S. PATENT DOCUMENTS

| | | | | |
|---|---|---|---|---|
| 3,248,126 A * | 4/1966 | Saxton | ................ | B62D 25/188 280/851 |
| 3,877,722 A | 4/1975 | Conner | | |
| 4,097,090 A * | 6/1978 | Payne | ................ | B62D 25/188 280/851 |
| 4,319,764 A | 3/1982 | Whitaker | | |
| 6,139,062 A * | 10/2000 | Meyer | ..................... | B60P 1/283 280/847 |
| 6,402,200 B1 * | 6/2002 | Myers | ................. | B62D 25/188 280/851 |
| 6,584,628 B1 * | 7/2003 | Kummer | .............. | A61G 7/0527 5/615 |
| 6,684,754 B2 * | 2/2004 | Comer | ................. | B25J 9/1075 91/534 |
| 6,799,808 B1 * | 10/2004 | Walters | ................ | B62D 25/188 280/851 |
| 7,708,315 B1 * | 5/2010 | Dumitrascu | ......... | B62D 25/188 280/848 |
| 9,352,786 B1 * | 5/2016 | Martin | ................. | B62D 25/182 |
| 9,937,966 B1 * | 4/2018 | Yoon | ..................... | B62D 35/005 |
| 9,969,436 B1 * | 5/2018 | Gause | .................. | B62D 25/188 |

(Continued)

FOREIGN PATENT DOCUMENTS

| | | | | |
|---|---|---|---|---|
| CA | 2813890 A1 * | 10/2013 | ............. | B60B 39/12 |
| FR | 2798110 A1 * | 3/2001 | ............. | B62D 25/16 |
| KR | 101846719 B1 * | 4/2018 | ............. | F03G 7/065 |

*Primary Examiner* — James A Shriver, II
*Assistant Examiner* — Ian Bryce Shelton
(74) *Attorney, Agent, or Firm* — Royal W. Craig; Gordon Feinblat LLC

(57) ABSTRACT

A mud flap retraction system uses two artificial muscles that extend horizontally toward the mud flaps to an elbow, and then hang down alongside the mud flaps opposite the vehicle tire. Also provided is a source of compressed air or fluid, at least one valve for selectively inflating and deflating, the bladder(s), and an operator control inside the vehicle cabin that quickly and reliably raises (or lowers) the mud flaps at the operator's command. Inflation effectively raises the artificial muscles from a limp position (hanging with the mud flaps) to a stiff raised position (thereby raising the mud flaps rearwardly).

21 Claims, 3 Drawing Sheets

(56) References Cited

U.S. PATENT DOCUMENTS

| | | | |
|---|---|---|---|
| 10,207,744 B1* | 2/2019 | Smith | B62D 25/182 |
| 10,683,041 B1* | 6/2020 | Smith | B62D 25/182 |
| 2003/0098577 A1* | 5/2003 | Keller | B62D 25/188 |
| | | | 280/851 |
| 2003/0184078 A1* | 10/2003 | Grable | B62D 25/188 |
| | | | 280/847 |
| 2004/0164539 A1* | 8/2004 | Bernard | B62D 25/188 |
| | | | 280/848 |
| 2009/0289446 A1* | 11/2009 | Proctor | B62D 25/188 |
| | | | 280/847 |
| 2012/0068448 A1* | 3/2012 | Lasser | B62D 25/182 |
| | | | 280/851 |
| 2016/0128278 A1* | 5/2016 | Rau | B62D 25/182 |
| | | | 293/58 |
| 2018/0222274 A1* | 8/2018 | Davis | B60G 17/0408 |
| 2019/0329622 A1* | 10/2019 | Coombs | B60G 17/017 |

\* cited by examiner

MUD FLAP RETRACTORS

CROSS-REFERENCE TO RELATED APPLICATION(S)

The present application derives priority from U.S. Provisional Patent Application 62/980,608 filed 24 Feb. 2020.

BACKGROUND OF THE INVENTION

1. Field of the Invention

The present invention relates to truck accessories and, more particularly, to a system for retracting mud flaps to a raised position away from the truck tires when backing up or dumping.

2. Description of the Background

Most states require mud flaps to be mounted on trucks and trailers to prevent the tires of such vehicles from spraying water, mud and road debris onto trailing vehicles. State statutes also govern the spacing between the bottom edge of the mud flaps and the ground, as well as the spacing between the inner surface of the mud flaps and the vehicle tires. Unfortunately, mud flaps are easily torn from their mounting brackets during backing up or when dumping a load at the back of the vehicle. For example, when a dump truck is backing up and dumping its load the tires may sink into the soil, or run over a curb, thereby trapping the mud flap against the tire or ground and ripping it off. In some cases the flap brackets, decorative chrome, and other hardware is lost as well.

Owners and operators of such vehicles are frustrated not only by the time and expense required to replace mud flaps, but also the vehicle downtime while waiting for replacement parts. The state regulations are strictly enforced and fines are steep.

There have been efforts to ameliorate the problem with mud flap retraction systems that temporarily move the mud flaps away from the tires while backing up or dumping. For example, U.S. Pat. No. 3,877,722 to Conner shows a vertical center bar fastened to the mud flap. The mud flap is supported by the center bar, but can be detached from the center bar to permit the roll up of the mud flap when not in use.

U.S. Pat. No. 4,319,764 to Whitaker suggest a special frame to hold the mud flaps in place relative to the wheel. The horizontal swing arms of the mounting frame are pivotably mounted to permit the arm to swing forward to minimize damage as the vehicle is backing up.

U.S. Pat. No. 3,248,126 to Saxton et al. also suggests a mechanical lift arm but it is powered by cylinder connected to the lift arm.

Unfortunately, all the foregoing mechanical mechanisms are subject to the same damage as the mud flaps themselves during back up and/or dumping. Impact can damage the components rendering the lift systems inoperable. Moreover, more intricate components are prone to environmental wear and tear. What is needed is a more efficient, reliable and robust mud flap retraction system that avoids damage to the mud flaps when backing a vehicle or dumping a load, and is not itself prone to damage.

SUMMARY OF THE INVENTION

Accordingly, it is an object of the present invention to provide an improved mud flap retraction system that quickly and reliably raises (or lowers) the mud flaps at the operator's command.

Another object is to provide an improved mud flap retraction system as described above that is more efficient, reliable and robust in operation.

Another object is to provide a mud flap retraction system that is itself resistant to damage and wear.

Yet another object is to provide an improved mud flap retraction system that is simple, relatively inexpensive, and easy to install and operate on existing vehicles.

These and other features and benefits are achieved with an improved mud flap retraction system that generally includes two artificial muscles each comprising an elongate bladder that actuates from a limp position (hanging with the mud flaps) to a stiff raised position (thereby raising the mud flaps) upon filling of the bladders with pressurized air or hydraulic fluid. Upon the immediate application of hydraulic or pneumatic pressure to the bladders, volume expansion occurs, but is confined by braided/netted fabric that encircles each bladder. This translates the volume expansion to a linear expansion and increased rigidity along the axis of the bladder. Both bladders extend horizontally toward the mud flaps to an elbow, and include a hanging section that hangs limp alongside the mud flap opposite the vehicle tire. Inflation effectively raises the bladder from the limp (hanging) position to a stiff raised position, thereby raising the mud flaps rearwardly. Also provided is a source of compressed air or fluid, at least one valve for selectively inflating and deflating the bladder(s), and an operator control inside the vehicle cabin that quickly and reliably raises (or lowers) the mud flaps at the operator's command.

For a more complete understanding of the invention, its objects and advantages, refer to the remaining specification and to the accompanying drawings.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a simple more efficient, reliable and robust mud flap retraction system that is itself resistant to damage while backing up and/or dumping.

Figure 1:
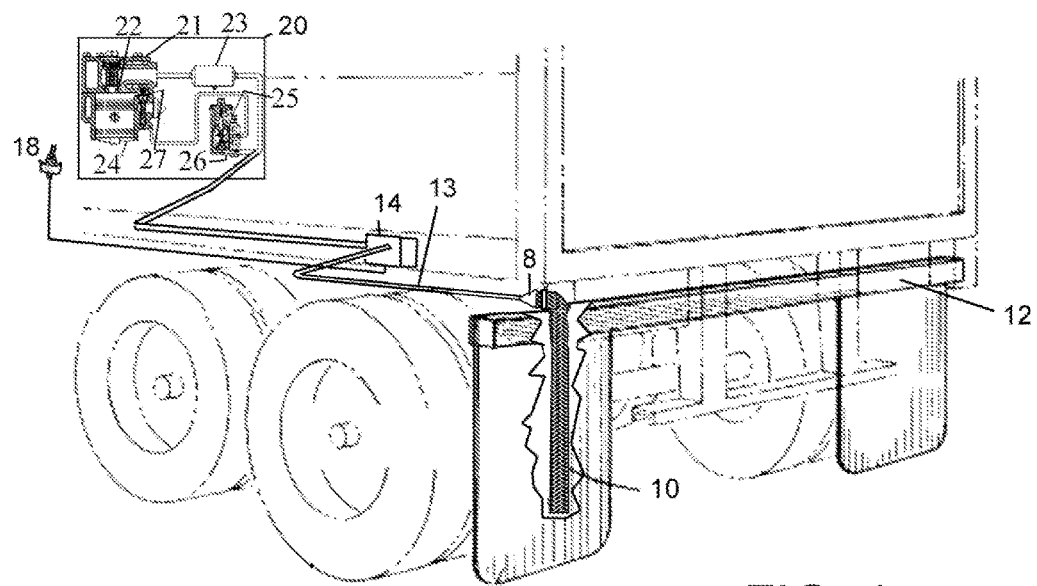
FIG. 1 is a side perspective view including a cutaway of the left rear mud flap illustrating an artificial muscle 10 used in the mud flap retraction system according to an embodiment of the present invention.
Figure 3:
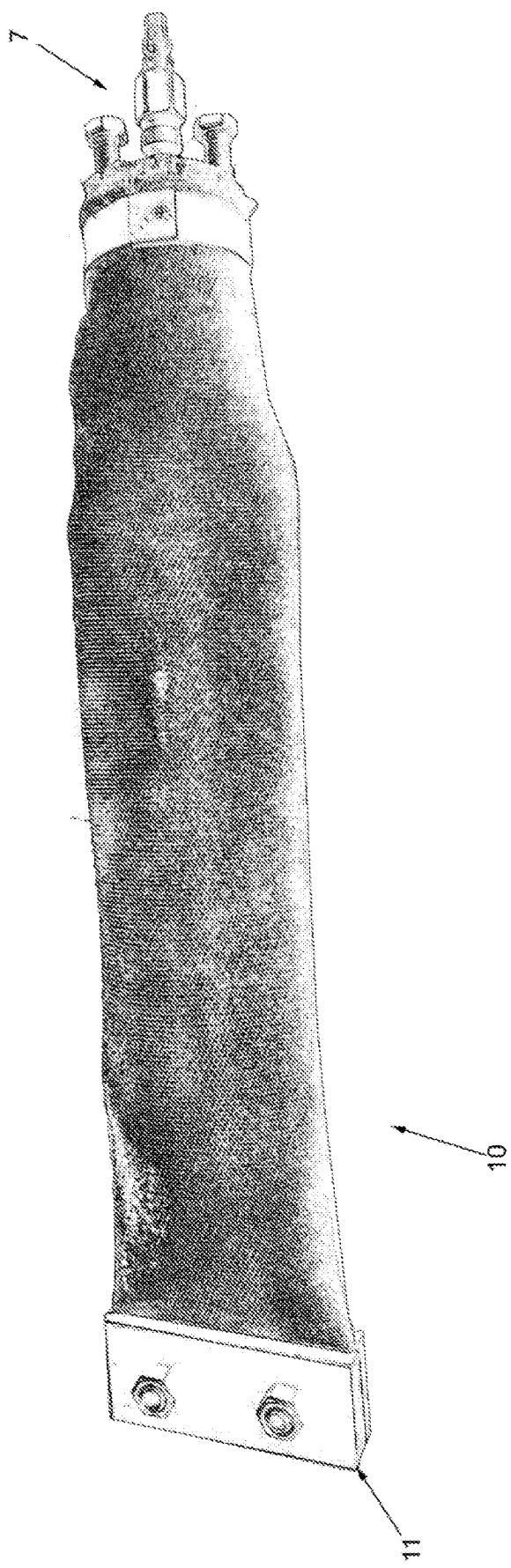
FIG. 3 is a side profile view of the artificial muscle 10 used in the mud flap retraction system of FIG. 1 with sealed working end (at left).

Referring to FIG. 1, the mud flap retraction system generally includes two elongate artificial muscles 10 (one being shown), one on each side of the vehicle undercarriage, each having a coupling end in fluid communication with a fluid supply and supported generally horizontally on or by the vehicle undercarriage. Each artificial muscle 10 extends horizontal toward a respective mud flap to an elbow, and in an unpressurized state, a distal length of each artificial muscle 10 hangs downward therefrom in a limp configuration adjacent to and immediately behind its respective mud flap. In a preferred embodiment (illustrated) the artificial muscles 10 are both extensional pneumatic artificial muscles (PAMs) operated by pressurized air filling a pneumatic bladder. Each artificial muscle 10 comprises a length of fabric or fiber-reinforced rubber tubing, or rubber-impregnated woven fabric tubing 6, having a fluid coupling 8 at one end and extending to a sealed working end. As seen in FIG. 3 a 2-4' length of reinforced rubber tubing will suffice depending on the size of the mud flaps, in which case each mud flap weighs approximately 5-10 lbs. Given actuation pressure of between 0 and 10 bar (145 psi), and a considerably higher bursting pressure, artificial muscle 10 generates appropriate lift for a typical mud flap.

In practice, it has been found that tubular fire hose material in compliance with the NFPA Fire Hose Standard has a bursting pressure in excess of 110 bar (1600 psi) and makes a suitable artificial muscle when cut to length, sealed at one end, and provided with a fluid coupling at the other end as will be described. Fire hose material typically comprises a rubber tube inside a nylon or polyester blend fabric sheath, though a woven cotton fabric sheath will suffice. Moreover, fire hose material is extremely durable and can last for tens of thousands of cycles described below, which greatly increases the durability of the system as compared to prior art mechanical lever arms.

Figure 2:
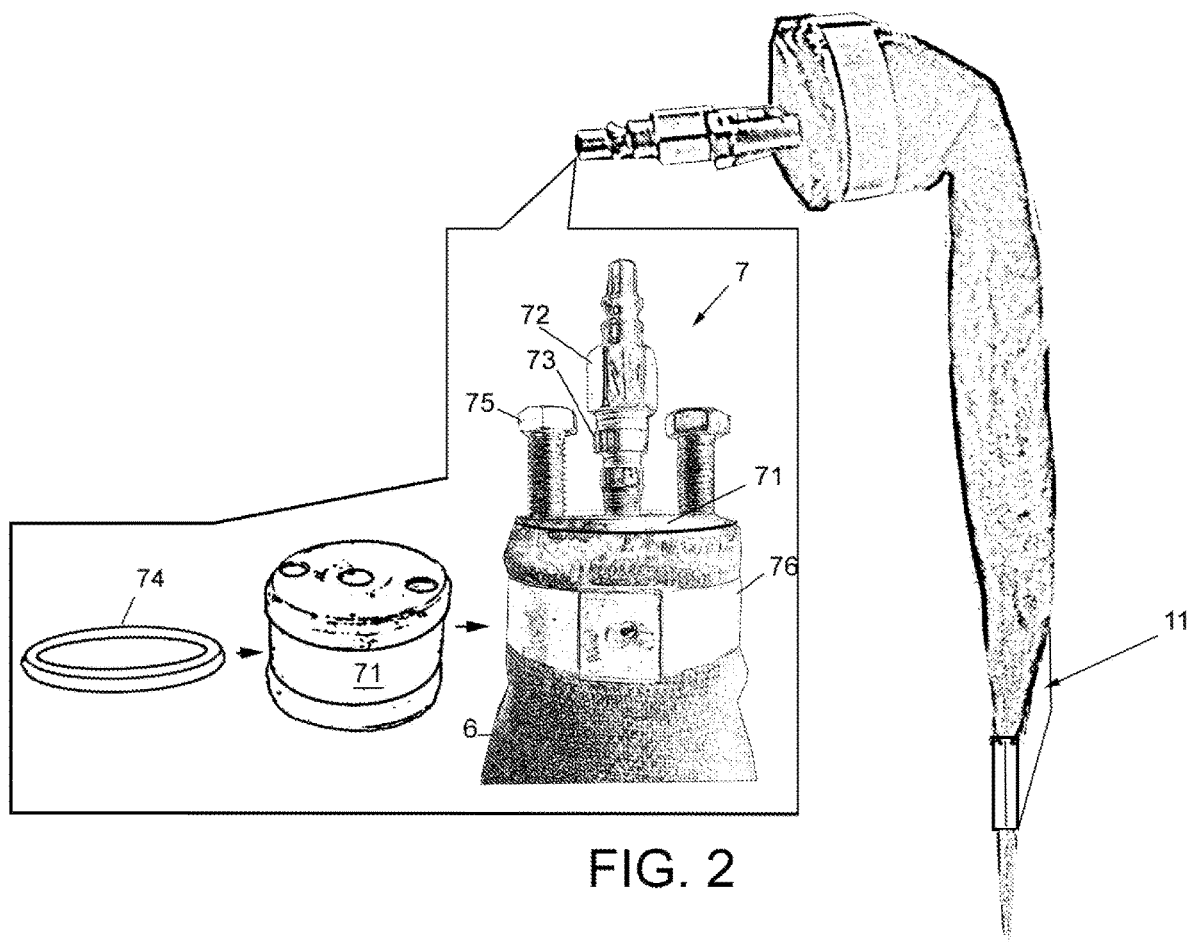
FIG. 2 is a side profile view of the artificial muscle 10 used in the mud flap retraction system of FIG. 1 with enlarged inset showing the coupling end.

In an exemplary embodiment seen in FIG. 3, the artificial muscle 10 is firmly sealed at one end (left) by doubling the hose back onto itself, sewing the doubled-end together, and compressing the sewn end with two stainless steel threaded plates screwed together in a crimp sandwich 11. As seen in FIG. 2, the coupling end typically comprises a quick-conned fitting 7 for coupling to a pneumatic line 13 as will be described. The quick-connect fitting 7 can be constructed by fashioning an annular hose insert 71 with a central threaded channel, screw-inserting a pneumatic hose adapter 73 in the channel, and attaching a quick-connect pneumatic coupling 72 to the hose adapter 73. Additional threaded channel can be provided for attaching the hose insert 71 by screws 75 to a bracket or the frame of the vehicle to secure the artificial muscle 10 in place. To withstand the necessary pressure without leaking the annular hose insert 71 should be provided with an annular O-ring channel and an elastomeric O-ring 74 inserted thereon prior to insertion onto the open end of hose material 6. Finally, after insertion of hose insert 71 into the open end of hose material 6, a suitable O-clamp 76 is wrapped externally about the hose material 6 and is tightly clamped thereabout to seal the annular hose insert 71 therein.

Referring back to FIG. 1, quick-connect coupling 72 is inserted into a quick-connect receptacle 8 for fluid communication to a pneumatic line 13. The pneumatic line 13 runs to a valve 14 that is electromechanically-actuated by a switch 18 located in the vehicle cabin. The valve 14 is also in fluid communication with a source of compressed air 20, which may be any pre-existing source on the truck, e.g., tapping into existing pneumatic brake lines. Alternatively, a commercial air tank compressor may be installed. In either case the compressed air source generally includes the pneumatic components pictured in box 20, including a compressor 21, discharge valve 22, reservoir 23, piston 24, exhaust valve 25, inlet valve 27, and governor 26. These are standard commercial components typical of commercially-available Cat™ air compressors with 120 psi governors. Preferably there are two artificial muscles 10, one behind each mud flap, and both connected by quick-connect coupling 8 to pneumatic lines 13. One skilled in the art should understand that both pneumatic lines 13 may run to a single valve 14 that is electromechanically-actuated by a single switch 18 located in the vehicle cabin. Alternatively, and as a matter of design choice, each pneumatic line 13 may run to a dedicated valve 14, the two valves 14 being independently electromechanically-actuated by a dual switch 18 located in the vehicle cabin. The two artificial muscles 10 are preferably attached behind their respective mud flaps.

In operation, the two artificial muscles 10 hang limp behind their respective mud flaps and adjacent thereto. However, when the vehicle operator desires to raise them he or she simply flips switch 18, thereby opening valve 14 and admitting pressurized fluid into the two artificial muscles 10. The increased 110-120 psi pressure instantly translates to increased rigidity along the axis of the two artificial muscles 10, which causes both to immediately rise at the elbow to a stiff raised position, thereby raising the mud flaps as well. There is almost no lag time in operation.

Figure 4:
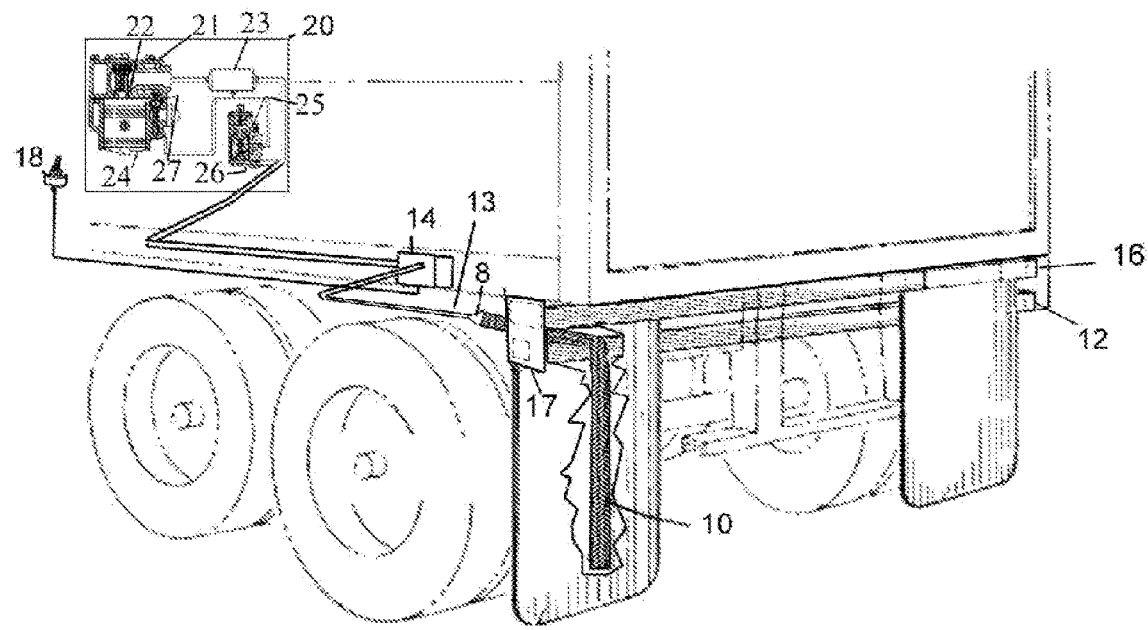
FIG. 4 is a side perspective view illustrating the mud flap retraction system according to an alternate embodiment of the present invention.
Figure 5:
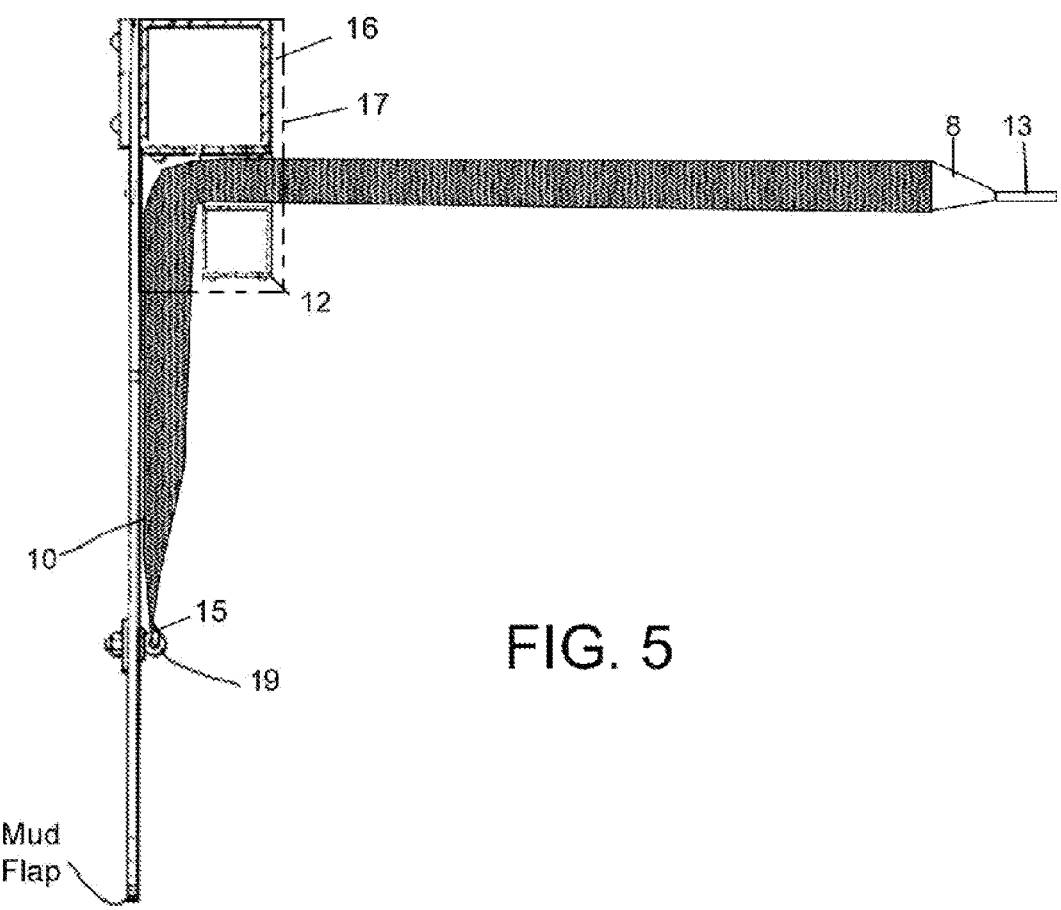
FIG. 5 is a side profile view of the embodiment of FIG. 4.

FIGS. 4-5 show an alternate embodiment of the system of FIGS. 1-3 in which the mud flap retraction system generally includes two elongate artificial muscles 10 as described above (again, one being shown), one on each side of the vehicle undercarriage, each having a coupling end supported generally horizontally on or by the vehicle undercarriage and extending toward a respective mud flap to a cross-member 12 and draped over the cross-member 12 at an elbow. Again the artificial muscles 10 are both extensional PAMs. Each artificial muscle 10 traverses the cross-member 12 and, in an unpressurized state, a distal length of each artificial muscle 10 hangs downward therefrom in a limp configuration adjacent to and immediately behind its respective mud flap. Each artificial muscle 10 may be constructed as described above and be connected by a coupling 8 to a pneumatic line 13. The pneumatic line 13 runs to a valve 14 that is likewise activated by a switch 18 located in the vehicle cabin. The valve 14 is in fluid communication with a source of compressed air 10 such as compressor 21, discharge valve 22, reservoir 23, piston 24, exhaust valve 25, inlet valve 27, and governor 26 as described above.

As best seen in FIG. 5, an exemplary attachment configuration for the two artificial muscles 10 comprises two parallel cross-members, an upper cross-member 16 and lower cross-member 12 spaced apart vertically by approximately the width of an artificial muscle 10, offset horizontally by approximately the same measure with lower cross-member being rearmost, and secured at both ends by flange 17. This way, the two cross-members 12, 16 span the back of the vehicle. In practice, the upper cross-member 16 may be an existing component of the vehicle such as the rearmost cross-strut of the vehicle frame, in which case the lower cross-member 12 and flange 17 are retrofit components attached to the existing vehicle by bolting, welding or the like. In either case both mud flaps are attached as shown in FIG. 5 in a conventional manner to the rear of upper cross-member 16. The artificial muscle 10 passes between the upper and lower cross-members 12, 16 and, in an unpressurized state, drapes down over the lower cross-member 12 such that a distal length (1-2') of each artificial muscle 10 hangs downward therefrom. The distal end of each artificial muscle 10 may be sealed by heat welding, threading the tip through an O-ring 15 and sewing the tip back onto itself to secure the O-ring 15. The O-ring 15 is then secured to the mud flap by an eye-bolt 19 screwed through the mud flap and bolted thereto.

Both of the above embodiments are capable of quickly and reliably raising and lowering the mud flaps at the vehicle operator's command, and are more efficient, reliable and robust in operation when compared to purely electric or mechanical means. Indeed, upon sensing impending damage from a curb or other obstacle the vehicle operator can raise the mud flaps in approximately one second. Moreover, the system is lighter, easier to install, can be connected to existing pneumatics, and can be retrofit to most existing construction vehicles. One skilled in the art will understand that components of embodiments of this disclosure can be formed from any materials suitable for the purposes of this disclosure and attached or otherwise joined according to a attachment mechanisms suitable for the purposes of this disclosure.

Having now fully set forth the preferred embodiments and certain modifications of the concept underlying the present invention, various other embodiments as well as certain variations and modifications of the embodiments herein shown and described will obviously occur to those skilled in the an upon becoming familiar with said underlying concept. It is to be understood, therefore, that the invention may be practiced otherwise than as specifically set forth in the appended claims.

I claim:

1. A mud flap retraction system for raising a mud flap of a vehicle, comprising:
    a source of compressed fluid;
    a valve connected downstream to said source of compressed fluid;
    a valve actuator mounted inside a cab of said vehicle for actuating said valve;
    an elongate artificial muscle connected downstream of said valve and configured to articulate from a limp position hanging adjacent said mud flap to a stiff raised position upon inflation thereof, thereby raising the mud flap.

2. The mud flap retraction system of claim 1, wherein said valve actuator is a switch electrically connected to said valve for actuation thereof.

3. The mud flap retraction system of claim 1, wherein said compressed fluid is air and said source of compressed fluid is a compressor.

4. The mud flap retraction system of claim 3, wherein said artificial muscle is an extensible pneumatic artificial muscle (PAM).

5. The mud flap retraction system of claim 4, wherein said PAM comprises woven-fiber sheath about a rubber hose.

6. The mud flap retraction system of claim 5, wherein said PAM is sealed at one end by folding over onto itself, and clamping said folded end between two plates.

7. The mud flap retraction system of claim 6, wherein said PAM comprises a quick-connect pneumatic fitting at another end.

8. The mud flap retraction system of claim 5, wherein said PAM comprises an annular insert inserted into an end of said fiber reinforced hose.

9. The mud flap retraction system of claim 8, wherein said PAM is attached to said vehicle by attachment to said annular insert.

10. The mud flap retraction system of claim 8, wherein said PAM comprises an O-ring seated in an annular channel encircling said annular insert.

11. The mud flap retraction system of claim 10, wherein said PAM comprises an O-clamp encircling said fiber reinforced hose and annular insert.

12. The mud flap retraction system of claim 1, wherein said artificial muscle hangs over a lower cross-member.

13. The mud flap retraction system of claim 12, further comprising a pair of flanges attached to each end of said lower cross-member for attachment to said vehicle.

14. The mud flap retraction system of claim 13, wherein said pair of flanges are attached to an upper cross-member parallel to said lower cross-member and offset forward and upward therefrom.

15. The mud flap retraction system of claim 14, wherein in an unpressurized state, said artificial muscle runs between said upper cross-member and lower cross-member and drapes down over the lower cross-member.

16. A mud flap retraction system for raising a mud flap of a vehicle, comprising:
    an air compressor having an output valve;
    a switch mounted inside a cab of said vehicle for actuating said compressor valve;
    an artificial muscle connected downstream of said valve, supported by a first cross-member, and attached to said mud flap;
    whereby activation of said switch actuates said compressor to inflate said artificial muscle and articulate it from a limp position to a stiff position raising the mud flap.

17. The mud flap retraction system of claim 16, wherein said artificial muscle is an extensible pneumatic artificial muscle (PAM).

18. The mud flap retraction system of claim 17, wherein said PAM comprises woven-fiber-reinforced rubber.

19. The mud flap retraction system of claim 17, wherein said PAM is sealed at one end and secured to said mud flap at said sealed end.

20. The mud flap retraction system of claim 19, wherein in an unpressurized state, said artificial muscle drapes over said first cross-member.

21. A method of raising a mud flap, comprising the steps of:
    inflating an artificial muscle adjacent to said mud flap so as to articulate said artificial muscle from a limp position hanging adjacent said mud flap to a stiff raised position upon inflation thereof, thereby raising the mud flap.

* * * * *